Nov. 21, 1961  M. P. A. MOULIN  3,009,868
LATCHING DEVICES FOR NUCLEAR FUEL ELEMENTS
Filed June 26, 1958  5 Sheets-Sheet 1
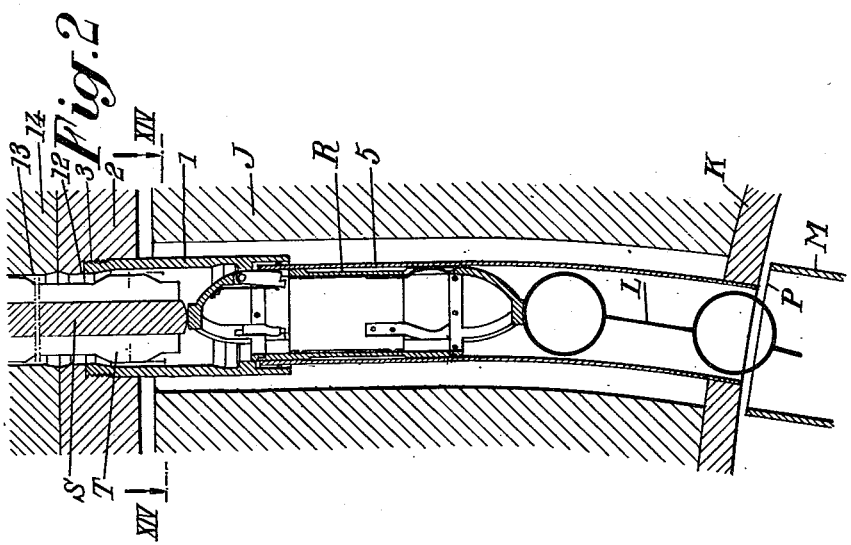
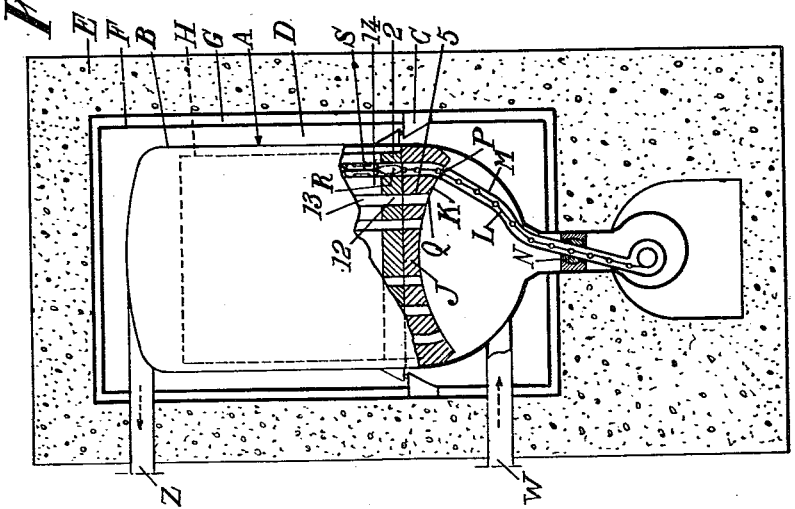

Nov. 21, 1961  M. P. A. MOULIN  3,009,868
LATCHING DEVICES FOR NUCLEAR FUEL ELEMENTS
Filed June 26, 1958   5 Sheets-Sheet 3

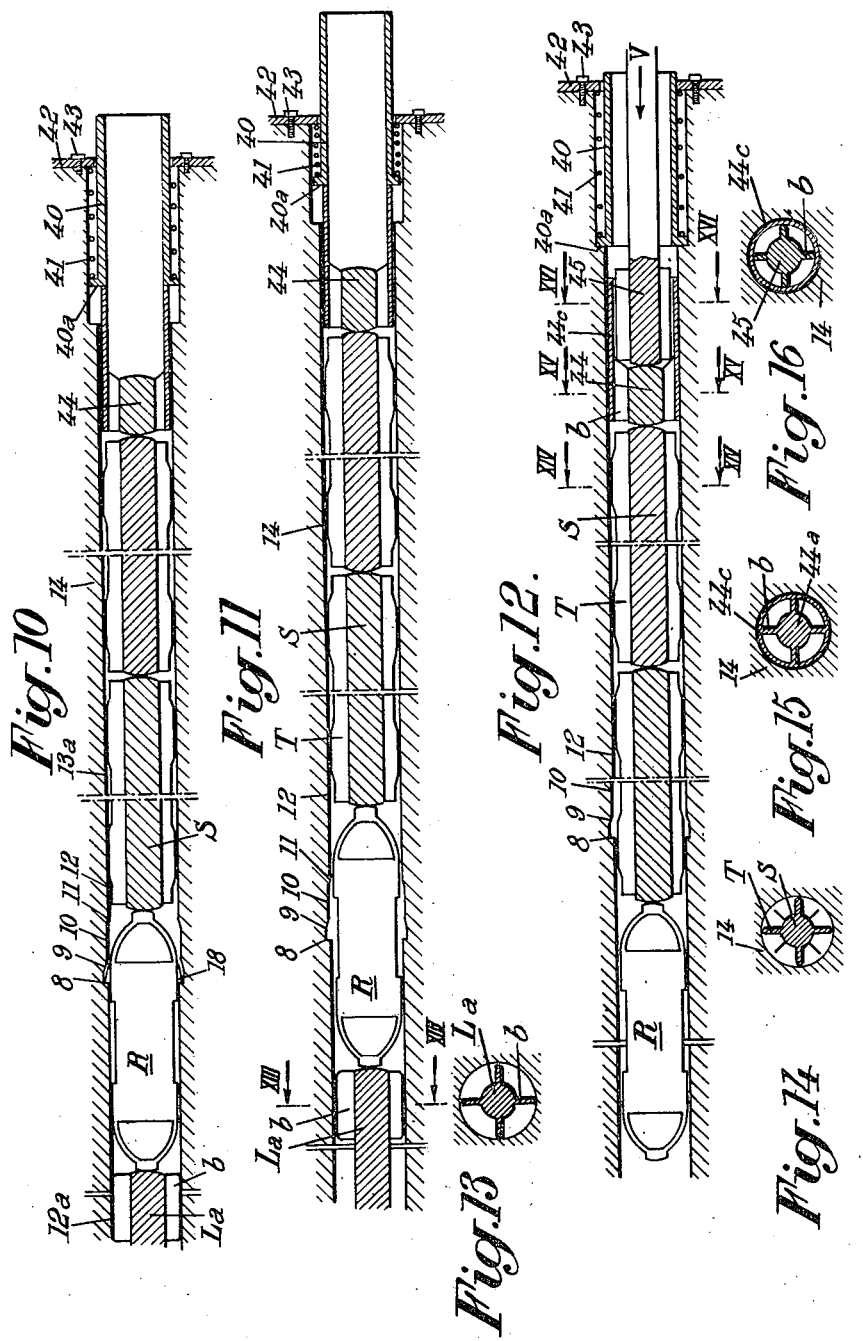

United States Patent Office 3,009,868
Patented Nov. 21, 1961

3,009,868
LATCHING DEVICES FOR NUCLEAR
FUEL ELEMENTS
Maurice Pierre André Moulin, Gif-sur-Yvette, France, assignor to Commissariat a l'Energie Atomique, Paris, France, a state administration
Filed June 26, 1958, Ser. No. 744,863
Claims priority, application France June 28, 1957
4 Claims. (Cl. 204—193.2)

The present invention relates to apparatus for loading and unloading fissionable elements into and from channels and in particular for the charging of fuel slugs into the channels of a reactor and their removal therefrom. The invention is more especially, but not exclusively, concerned with the case where the reactor channels are vertical.

In such reactors, it is necessary, after columns of fuel slugs have been introduced into the channels, to make use of a latching device to hold each of said columns of slugs in position.

The object of the present invention is to provide a latching device of this kind which is better adapted to meet the requirements of practice than those used for the same purpose up to the present time and in particular which complies with the following conditions:
 (a) Possibility of automatic remote control with an accuracy sufficent to eliminate the possibility of jamming or other defective operation;
 (b) Simplicity and high resistance to mechanical, thermal and neutron stresses;
 (c) Possibility of repeated utilization.

For this purpose, the latching mechanism according to the present invention includes on the one hand, a hollow body provided with latching fingers movably mounted thereon and adapted to project therefrom, said fingers being retractable in said body and, on the other hand, a slidable member movable longitudinally with respect to said body between two end positions, said member carrying on the one hand friction elements resiliently urged outwardly so as to project with respect to said body and on the other hand a portion capable, when said member is moved into one of said positions, of locking said latching fingers in retracted position whereas it releases said fingers when said member is moved away from said last mentioned position.

Preferred embodiments of this invention will be hereinafter described with reference to the accompanying drawings given merely by way of example and in which:

FIG. 1 is a diagrammatic vertical sectional view of a nuclear reactor having vertical channels and cooled by means of a fluid under pressure, said reactor including a latching mechanism according to the invention.

FIG. 2 is a view showing on an enlarged scale, in vertical section, a portion of the lower end of the core of the reactor of FIG. 1, a latching unit according to the present invention being shown engaged under a channel of the reactor.

Figure 3:
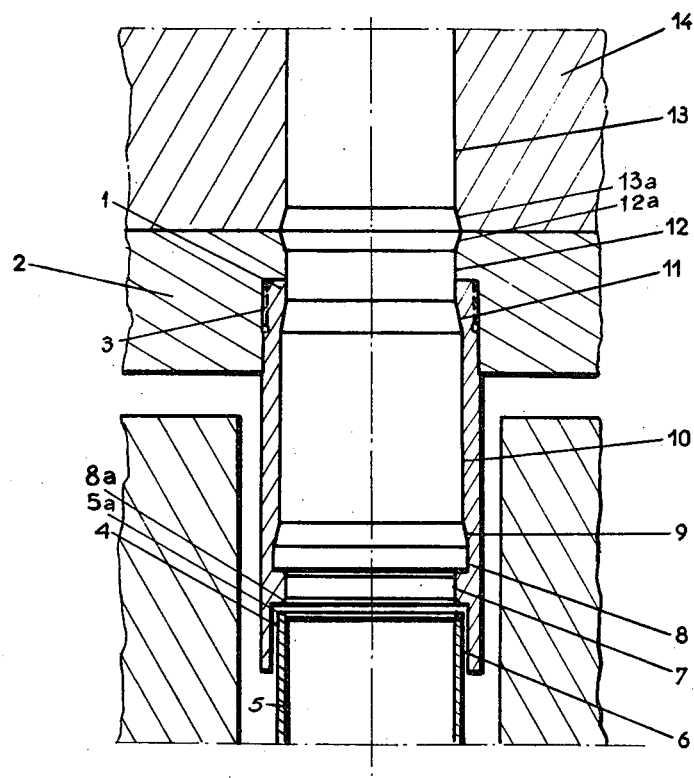
FIG. 3 is a vertical sectional view on a larger scale of the lower end of a reactor channel and of conduit means forming part of the latching mechanism of the invention.
Figure 5:
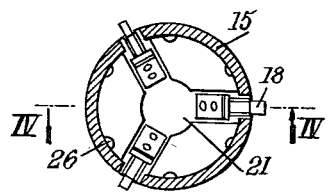
FIG. 5 is a horizontal sectional view, along line V—V of FIG. 4.
Figure 4:
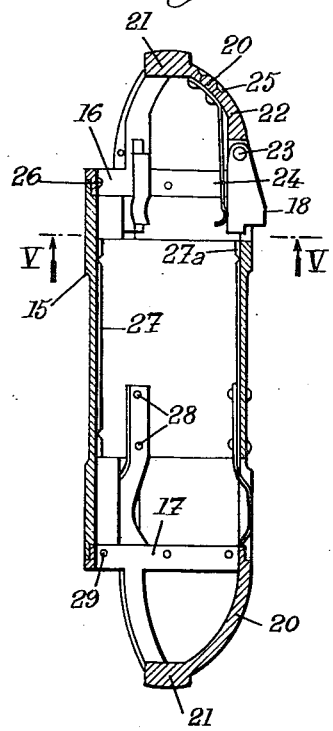
FIG. 4 is a vertical sectional view, along line IV—IV of FIG. 5, of a latching unit made according to an embodiment of the invention.

FIGS. 6 to 9 inclusive illustrate the operation of the latching unit of FIGS. 4 and 5 cooperating with elements of the conduit means of FIG. 3.

FIGS. 10, 11 and 12 are axial sectional views of a horizontal nuclear reactor channel with a set of slugs and a latching mechanism according to the invention, in different relative positions respectively.

FIG. 13 is a sectional view on the line XIII—XIII of FIG. 11.

FIGS. 14, 15 and 16 are sectional views, on the lines XIV—XIV, XV—XV and XVI—XVI, respectively, of FIG. 12.

FIGS. 1 and 2 show a vertical nuclear reactor cooled by means of a fluid under pressure and making use of a solid moderator constituted for instance by graphite. This reactor A includes a pressure shell B carried by a support C in a space D provided inside a biological shield E constituted for instance by concrete walls.

As a rule, a thermal shield F is disposed inside this biological shield E at some distance therefrom so as to permit the circulation of the cooling fluid through space G. The cooling fluid enters in shell B through channel W and leaves said shell through channel Z. Inside shell B is located the core H of the reactor, consisting in graphite blocks 14 piled upon one another so as to form a structure provided with vertical channels 13, these channels being for instance of circular cross section. The graphite core is supported by a flat base 2 provided with channels 12 corresponding to those provided in the graphite structure and carried by a frame J.

Circulation tubes 5 extend thorugh said frame J in line with channels 12 and 13, the lower ends of said tubes 5 opening into a surface K.

For the loading and unloading of such a reactor, there are different systems. In particular, as shown by FIG. 1, such a system may be constituted by a flexible ram structure L movable in a bent tube M pivotable on a pivot N located under surface K. This surface is in the form of a portion of a sphere and pivot N is located at the center thereof. Thus the upper end P of tube M can be brought into register with any of the lower ends Q of circulation tubes 5 and the flexible ram means L then permit of pushing the latching unit R into the desired channel 13. Said latching unit R supports one or several fuel slugs containing a fissionable material. As a rule, such a latching unit R supports a column of slugs S filling a channel 13.

Advantageously, slugs S (as shown in FIGS. 2 and 13) carry fins T which permit the circulation of the coolant fluid through channel 13 and increase the heat transmission between said slugs and the coolant fluid.

The charging of such a column of slugs and the possibility of withdrawing it from channel 13 are obtained by means of a latching unit R. This latching unit (FIGS. 4 and 5) includes a body comprising a central portion 15 of cylindrical form and two end portions 16 and 17 mounted thereon.

The upper end portion 16, secured to the central portion 15 by rivets 26, includes three arms 20 located in radial planes at 120° to one another and the upper ends of which are integral with a hub 21. The lower portions 22 of arms 20 are provided with radial slots in which are movably mounted three latching fingers 18, pivoted about pins 23. Three springs 24 fixed to arms 20 by rivets 25 urge fingers 18 outwardly so as to cause them to project from the body of the latching unit.

The lower end portion 17 is of the same general shape as end portion 16 and is fixed to central portion 15 by means of rivets 29.

A sleeve 27 is slidably mounted inside central portion 15 so as to be able to move longitudinally therein. Three springs 19 are fixed to the inner wall of said sleeve 27 by rivets 28. These springs 19 are so shaped that when sleeve 27 is mounted in the central portion 15, they project to the outside of the body through slots provided therein. The lower ends of springs 19 bear against an annular ridge of the end port 17 when sleeve 27 goes down in said portion 15 (in the circumstances indicated hereinunder), thereby unlocking springs 19 from said slots.

In line with every channel 13 of the reactor, there is mounted a conduit 1 fixed in the base 2 of the core, for instance by screw-threads 3 (FIG. 3).

This conduit 1 includes

Figure 7:
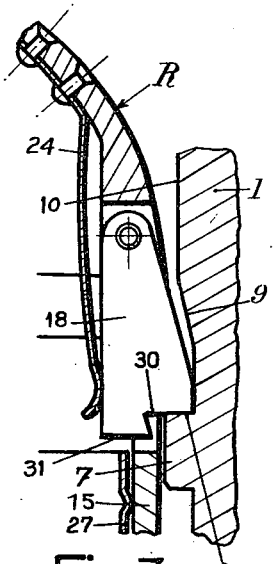
Figure 8:
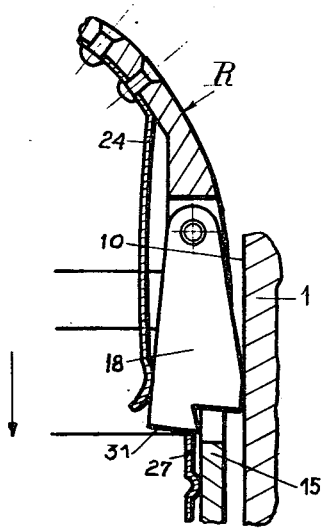
Figure 9:
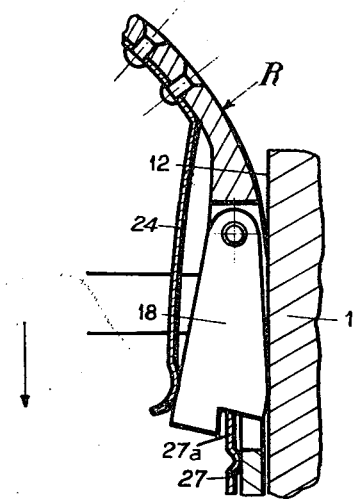

A housing 4 intended to fit on a circulation tube 5. Tube 5 is free to expand from its lower end (not visible in FIG. 3); the horizontal differential expansions are made possible by the provision of a metallic ring 6;

A first cylindrical passage 7 of a diameter equal to the diameter of the inner wall of tube 5;

Circular grooves or shoulders 8 intended to receive latching fingers 18 (FIGS. 4 and 5) in the position of FIG. 7;

A first frusto-conical tapering surface 9 acting as a cam and having substantially the same slope as the sides of the edges of the latching fingers 18 when they are in expanded position (see FIG. 7);

A second cylindrical surface 10 of a diameter intermediate between that of groove 8 and that of circulation tube 5 so as to keep fingers 18 in the position illustrated by FIG. 8;

A second tapering surface 11 also acting as a cam and of a slope substantially equal to that of the edges of latching fingers 18 when said fingers are bearing against cylindrical surface 10, said tapering surface bringing said fingers into the position illustrated in FIG. 9;

A third cylindrical surface 12 of a diameter equal to that of circulation tube 5 and to that of channel 13.

To avoid any risk of jamming, the parts have chamfered edges such as shown in particular at 5a, 8a, 12a, and 13a, where distinct elements intended to be alined are adjoining one another.

Sleeve 27 being located inside cylinder 15 between fingers 18 and lower end portion 17 is moved in the reactor channel 13 and conduit 1 with said cylinder 15; but, under the effect of their friction against the walls of the conduits in which they are moving (inner wall of circulation tube 5 or of conduit 1), springs 19 cause sleeve 27 to be in its lowest position with respect to body portion 15 when the latching unit is moved upwardly and in its upper position with respect to said portion 15 when the latching unit is being moved downwardly. Therefore when the latching unit is pushed upwardly (FIGS. 6 and 7), latching fingers 18 are free to expand outwardly. When the latching unit is moved downwardly after fingers 18 have been retracted, the edge 27a of sleeve 27 engages the lower ends of said fingers 18 and locks them in the retracted position (FIG. 9). When the latching unit is being moved downwardly but fingers 18 have not been fully retracted (case of FIG. 8), sleeve 27 has no action on said fingers.

Figure 6:
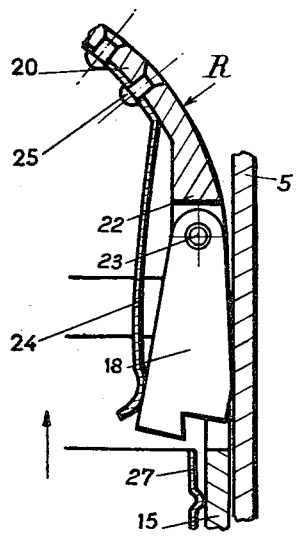

As shown in FIGS. 1, 2 and 6, when it is desired to load one channel 13 of a reactor, the column of slugs S and the latching unit R on which said column of slugs is resting are engaged into the correpsonding circulation tube 5 and pushed upwardly by means of the flexible ram means L. When the latching unit R is engaged into tube 5, fingers 18 urged outwardly by springs 24 slide along the wall of said tube 5. The springs 19 of sleeve 27 the lower ends of which are bearing upon the ridge of end portion 17 (FIGS. 2 and 6) also rub against the wall of tube 5.

When the lower edge 30 of fingers 18 comes at the level of groove 8, said fingers are moved outwardly by springs 24. If, after a small upward displacement beyond this position, the latching unit is caused to move back downwardly, said edge 30 comes to bear upon the shoulder formed by the lower edge of groove 8, which supports latching unit R through said fingers 18, the column of slugs resting upon said latching unit (FIG. 7). Then, when the flexible ram means L are retracted downwardly, the column of slugs and the latching unit remain in position. Thus the latching unit R must be moved beyond said position before it is allowed to move back downwardly under the action of gravity. In order to permit this displacement without any risk of fingers 18 being locked in retracted position (as it happens when fingers 18 reach tapering surface 11) a safety cylindrical surface 10 is provided between tapering surfaces 9 and 11, the diameter of said surface 10 being intermediate between the diameter of groove 8 and the diameter of cylindrical surfaces 12 and 13. As long as fingers 18 are in contact with this intermediate cylindrical surface 10, as shown by FIG. 8, said fingers are not retracted sufficiently to enable the top edge 27a of sleeve 27 to engage into the notch provided at the bottom of each finger 18, when the latching unit is allowed to move down.

In order to remove a column of slugs from channel 13, the flexible ram means such as L are operated so as to push latching unit R upwardly. Fingers 18 slide along surfaces 9 and 11 so as finally to come into contact with cylindrical surface 12 which is of the same diameter as channel 13 and tube 5. Said fingers 18 are thus fully retracted and, as soon as the latching unit is allowed to move back in the downward direction, sleeve 27 is caused to move upwardly with respect to cylindrical portions 15, so that its upper edge 27a engages the retracted fingers and keeps them locked in this position (as shown in FIG. 9). The column of slugs and the latching unit are so allowed to slide downwardly past groove 8 into which fingers 18 can no longer engage. It therefore suffices to cause flexible ram means L to move downwardly to permit the unloading of channel 13.

Slugs S and latching unit R can be removed from tube M in any suitable manner, with which the present invention is not concerned.

FIGS. 10 to 12 show another embodiment of the invention relating to the case where the reactor channels are horizontal.

One of said channels is shown at 13a. At one end thereof, there is a cylindrical surface 12a through which the slugs are introduced and removed.

Similarly to what has been described above, channel 13a includes a groove 8 and tapering surfaces 9 and 11 between which extends an intermediate cylindrical surface 10.

At the other end of channel 13a, there is disposed a sliding piston 40 having a flange 40a. A spring 41 is interposed between said flange and a holding plate 42 fixed at 43 on the right hand face of the moderator structure 14.

Spring 41 is capable of overcoming the frictional resistance due to the weight of the elements (slugs S, latching unit R) present in channel 13a. Its action corresponds, over a limited length, to the action of gravity in vertical channels of the above described reactor in order to cause latching unit R to move rearwardly.

Ahead of a series of slugs S introduced into a channel 13a, there is provided a piece 44 (the cross section of which is shown in FIG. 15) shaped to permit the passage of the coolant through the channel, this piece 44 including a hub 44a, a cylindrical outer portion 44c and radial fins b between these elements.

The latching unit R is identical to that above described with reference to FIGS. 4 and 5.

The operation of this latching mechanism is as follows:

For loading a channel (FIGS. 10 and 11) a piston La (or other ram means) pushes the whole towards the right. When all the slugs have been introduced into channel 13a (FIG. 11), piece 44 compresses spring 41. The latching fingers 18 move beyond groove 8 and along intermediate cylindrical surface 10. Then, piston La is withdrawn and spring 41 pushes back piece 40, slugs S and latching unit R until fingers 18, which are then expanded, come into contact with the left hand wall of groove 8.

In order to remove the slugs from channel 13a, piston La first pushes latching unit R towards the right to a distance such that fingers 18 reach the tapering portion 11 of the conduit and are retracted. They are locked in this retracted position, in the same manner as above described with reference to FIG. 9, when piston La is withdrawn and spring 41 pushes back piston 44, slugs S and latching unit R.

It is then possible to push back the whole assembly towards the left by means of a piston 45 the cross section of which is shown by FIG. 16. The fins b of piece 45 permit the circulation of the coolant through channel 13a.

Of course, the channels, instead of being either vertical as in FIGS. 1 to 9 or horizontal as in FIGS. 10 to 16, may make any acute angle with the vertical.

It will be seen that a latching mechanism as above described may be used not only in a nuclear reactor but also in any structure including channels intended to receive fissionable material elements, for instance in a lead container, a storing chamber and so on.

It should be well understood that an important advantage of the latching mechanism, according to this invention, is that the latching fingers are automatically locked and released by sleeve 27 so that if the different sets of tapering and cylindrical surfaces as above mentioned are provided at different places respectively in the same channel, a fuel slug may be positioned in said channel in different positions corresponding to said places respectively.

The latching unit according to the invention may be made of a material capable of resisting the action of the medium in which it is located. For instance, in the case of a graphite moderator, said unit may be made of milled steel if the unit is to be used only once. It is made of stainless steel when the moderator is liquid.

Furthermore, the external surface of the sliding unit must be given a surface treatment in order to prevent any possibility of jamming in the conduit where it is to circulate. Such a treatment may consists in parkerizing, bonderizing, "sulfinuzation" and so on.

The latching unit should undergo a suitable thermal treatment before it is introduced into the reactor to enable it to resist the Wigner effect.

The springs used in the latching unit are advantageously made of refractory nickel steel, for instance of the Nimonic type.

In order to prevent wedging of latching fingers 18 under the effect of the corrosion or dust, a sufficient play should be provided between the fingers and their pivot pins 23.

If, despite the precautions above stated, it becomes necessary to remove from a channel a column of slugs and the corresponding latching unit after some of these elements have jammed, the arms 20 of the end portion 16 of the latching unit facilitate this operation.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. In a structure including a channel, a latching mechanism which comprises, in combination, tubular conduit means in line with said channel and located at the inlet end of said channel, the inner wall of said conduit means including, in juxtaposition, from the outside toward said channel, a first cylindrical surface of the same cross section as said channel, a groove of larger cross section, a first tapering surface starting from said groove, an intermediate cylindrical surface starting from the smaller end of said tapering surface, the cross section of said intermediate cylindrical surface being intermediate between that of said groove and that of said channel, and a second tapering portion starting from said second cylindrical surface and the narrow end of which has the same cross section as said channel, and a latching unit including a cylindrical hollow body dimensioned to slide with a small play in said first cylindrical surface, said body being provided with slots located in axial planes thereof, latching fingers radially movable in said slots so as to be able to expand to the outside of said body, resilient means for urging said fingers outwardly, a member carried by said body, longitudinally slidable with respect thereto between two end positions, a frontward one and a rearward one, said member being shaped to engage, when it is in said frontward position, said fingers to lock them in retracted position with respect to said body, and resilient friction means carried by said member and projecting from the outer wall of said body to rub against said conduit means so as to bring said member in rearward position when said body is moved forward and in frontward position when said body is moved backward.

2. A mechanism according to claim 1 in which said slidable member is disposed inside said hollow body.

3. A mechanism according to claim 2 in which said fingers have an outer edge and an inner heel substantially perpendicular to the axis of said body, said outer edge being capable of projecting outwardly from said body but said heel remaining therein.

4. A mechanism according to claim 1 in which the length of the intermediate cylindrical surface is smaller than the length of the latching unit.

References Cited in the file of this patent

UNITED STATES PATENTS 2,756,858     Kasschau _____ July 31, 1956